(12) United States Patent
Han et al.

(10) Patent No.: US 12,437,847 B1
(45) Date of Patent: Oct. 7, 2025

(54) DRUG DESIGN METHOD BASED ON AUTOREGRESSIVE MODEL

(71) Applicant: The First Affiliated Hospital of Xi'an Jiaotong University, Xi'an (CN)

(72) Inventors: Suxia Han, Xi'an (CN); Yungang Xu, Xi'an (CN); Yuesen Li, Xi'an (CN); Chengyi Gao, Xi'an (CN); Yiping Li, Xi'an (CN); Xin Song, Xi'an (CN); Xiangyu Wang, Xi'an (CN)

( * ) Notice: Subject to any disclaimer, the term of this patent is extended or adjusted under 35 U.S.C. 154(b) by 0 days.

(21) Appl. No.: 19/031,343

(22) Filed: Jan. 18, 2025

(30) Foreign Application Priority Data

Jun. 12, 2024 (CN) .................. 202410754023.5

(51) Int. Cl.
| | |
|---|---|
| *G01N 33/48* | (2006.01) |
| *G01N 33/50* | (2006.01) |
| *G16C 20/50* | (2019.01) |
| *G16C 20/70* | (2019.01) |
| *G16C 20/90* | (2019.01) |

(52) U.S. Cl.
CPC ............ *G16C 20/50* (2019.02); *G16C 20/70* (2019.02); *G16C 20/90* (2019.02)

(58) Field of Classification Search
CPC ......... G16C 20/50; G16C 20/70; G16C 20/90
See application file for complete search history.

(56) References Cited

FOREIGN PATENT DOCUMENTS

CN    114464270 A    5/2022

OTHER PUBLICATIONS

Gaulton et al. ChEMBL: a large-scale bioactivity database for drug discovery. Nucleic Acids Research, vol. 40, Sep. 23, 2011, pp. D1100-D1107. (Year: 2011).*
Gaulton et al. The ChEMBL database in 2017. Nucleic Acids Research, vol. 45, Nov. 28, 2016, pp. D945-D954. (Year: 2016).*
CNIPA, Notification of a First Office Action for CN202410754023.5, Dec. 10, 2024.
The First Affiliated Hospital of Xi'an Jiaotong University (Applicant), Replacement claims (allowed) of CN202410754023.5, Dec. 23, 2024.
CNIPA, Notification to grant patent right for invention in CN202410754023.5, Mar. 18, 2025.

* cited by examiner

*Primary Examiner* — Russell S Negin
(74) *Attorney, Agent, or Firm* — Addison D. Ault; IPGentleman Intellectual Property Services, LLC (57) ABSTRACT

A drug design method based on an autoregressive model is provided, which relates to the field of drug design technologies. The method includes: applying a sub-word tokenization algorithm to biological text processing, training protein and ligand information in data sets to obtain a protein tokenizer and a ligand tokenizer, and constructing a tokenizer of the autoregressive model; processing and transforming original data in the data sets into a text form, and encoding by the tokenizer to construct a training data set for the autoregressive model; training the autoregressive model by the training data set, so that the autoregressive model can understand SMILES representations of ligands and learn an interaction mode between proteins and ligands; generating predicted ligands by using the trained autoregressive model, and post-processing through a chemical information tool to acquire candidate ligands with specific chemical structures; and evaluating and optimizing the candidate ligands to determine target candidate molecules.

8 Claims, 2 Drawing Sheets

Specification includes a Sequence Listing.

SEQUENCE LISTING

```
Sequence total quantity: 1
SEQ ID NO: 1          moltype = AA    length = 1068
FEATURE               Location/Qualifiers
source                1..1068
                      mol_type = protein
                      organism = synthetic construct
SEQUENCE: 1
MPPRPSSGEL WGIHLMPPRI LVECLLPNGM IVTLECLREA TLITIKHELF KEARKYPLHQ    60
LLQDESSYIF VSVTQEAERE EFFDETRRLC DLRLFQPFLK VIEPVGNREE KILNREIGFA   120
IGMPVCEFDM VKDPEVQDFR RNILNVCKEA VDLRDLNSPH SRAMYVYPPN VESSPELPKH   180
IYNKLDKGQI IVVIWVIVSP NNDKQKYTLK INHDCVPEQV IAEAIRKKTR SMLLSSEQLK   240
LCVLEYQGKY ILKVCGCDEY FLEKYPLSQY KYIRSCIMLG RMPNLMLMAK ESLYSQLPMD   300
CFTMPSYSRR ISTATPYMNG ETSTKSLWVI NSALRIKILC ATYVNVNIRD IDKIYVRTGI   360
YHGGEPLCDN VNTQRVPCSN PRWNEWLNYD IYIPDLPRAA RLCLSICSVK GRKGAKEEHC   420
PLAWGNINLF DYTDTLVSGK MALNLWPVPH GLEDLLNPIG VTGSNPNKET PCLELEFDWF   480
SSVVKFPDMS VIEEHANWSV SREAGFSYSH AGLSNRLARD NELRENDKEQ LKAISTRDPL   540
SEITEQEKDF LWSHRHYCVT IPEILPKLLL SVKWNSRDEV AQMYCLVKDW PPIKPEQAME   600
LLDCNYPDPM VRGFAVRCLE KYLTDDKLSQ YLIQLVQVLK YEQYLDNLLV RFLLKKALTN   660
QRIGHFFFWH LKSEMHNKTV SQRFGLLLES YCRACGMYLK HLNRQVEAME KLINLTDILK   720
QEKKDETQKY QMKFLVEQMR RPDFMDALQG FLSPLNPAHQ LGNLRLEECR IMSSAKRPLW   780
LNWENPDIMS ELLFQNNEII FKNGDDLRQD MLTLQIIRIM ENIWQNQGLD LRMLPYGCLS   840
IGDCVGLIEV VRNSHTIMQI QCKGGLKGAL QFNSHTLHQW LKDKNKGEIY DAAIDLFTRS   900
CAGYCVATFI LGIGDRHNSN IMVKDDGQLF HIDFGHFLDH KKKKFGYKRE RVPFVLTQDF   960
LIVISKGAQE CTKTREFERF QEMCYKAYLA IRQHANLFIN LFSMMLGSGM PELQSFDDIA  1020
YIRKTLALDK TEQEALEYFM KQMNDAHHGG WTTKMDWIFH TIKQHALN              1068
```

DRUG DESIGN METHOD BASED ON AUTOREGRESSIVE MODEL

TECHNICAL FIELD

The disclosure relates to the field of drug design technologies, and more particular to a drug design method based on an autoregressive model.

STATEMENT REGARDING SEQUENCE LISTING

The sequence listing associated with this application is provided in text format in lieu of a paper copy and is hereby incorporated by reference into the specification. The name of the XML file containing the sequence listing is 24013MYZ-USP1-SL.xml. The XML file is 2,816 bytes; is created on Dec. 5, 2024; and is being submitted electronically via patent center.

BACKGROUND

In recent years, drug research and development technologies have made remarkable progress in computational chemistry and bioinformatics. Traditional drug design strategies include: molecular docking, quantitative structure activity relationship (QSAR), pharmacophore, unsupervised learning, deep learning, and generative adversarial networks (GANs).

The molecular docking is a technology used to simulate an interaction between small molecules and large molecules (usually protein) and predict a best binding mode of the small molecules in protein active sites. This process includes several steps: first, the protein active sites are identified, then the small molecules are placed in multiple possible positions in the protein active sites, and possible binding modes are searched by rotating chemical bonds and changing conformations of the small molecules. Interaction energy will be calculated for each possible binding posture, which usually involves van der Waals force, hydrogen bonds, electrostatic interaction and other factors, and finally the most possible binding mode is determined according to the principle of minimum energy. However, it still has some limitations as follows.

Accuracy problem: scoring functions commonly used in the molecular docking try to predict an intensity of the interaction between the molecules, but these scoring functions are usually based on simplified physical models, which possibly cannot accurately reflect a complex biomolecular environment, such as dynamic water molecule effect and ionic strength change.

Computational complexity problem: for multiple active sites or very large molecules, computational requirements of the molecular docking increase sharply. In addition, considering the flexibility of ligands and target molecules, the computational complexity and required computational resources will further increase.

False positivity and false negativity problem: false positivity results with high scores (seemingly good combination) will be occurred during the docking process, or a really effective combination posture (false negativity) is missed due to lack of the scoring functions. This limits the reliability of docking in high flux screening.

The QSAR is a technology to establish a relationship between molecular structural characteristics and biological activities thereof by statistical methods. The core of this method is to construct a mathematical model between descriptors (such as physical and chemical properties of molecules, topological indexes and molecular graphs) and biological activity data. However, it still has some limitations as follows.
1. A QSAR model strongly depends on the quality and coverage of input data. When an available compound data set is not representative or too small, the prediction performance of the model is possibly significantly reduced.
2. Over-fitting problem: with a large number of descriptors and limited training samples, the QSAR model is prone to over-fitting, that is, the model performs well on a training set, but poorly on unknown data. This reduces generalization ability of the model.

The pharmacophore is a concept based on identifying and defining key chemical characteristics (such as hydrogen bond donors and acceptors, hydrophobic regions and ion pair acceptors) responsible for biological activity of the molecules. These characteristics are combined into a "virtual template" to screen or design new molecules that can interact with specific biological targets. The process of constructing a pharmacophore model usually includes identifying common characteristics of known active molecules, and based on this, deducing a minimum necessary combination of the characteristics that can induce a required biological response. The limitations thereof are as follows.
1. This method is possibly oversimplified and fails to consider overall characteristics of the molecules, such as flexibility and overall shape, which possibly leads to inaccurate activity prediction.
2. Dynamic changes of target proteins (such as conformational changes) are usually not considered in the pharmacophore model. Due to static nature of the model, real behaviors of the molecules in organisms are possibly incapable of being accurately predicted.
3. The success of the pharmacophore model depends largely on the quality and correlation of a selected reference molecular set. If there are not enough reference molecules or activity difference between the molecules is large, the model is possibly incapable of accurately capturing real and universal pharmacophore characteristics.

The unsupervised learning is a mode learned from data without explicit output labels, such as clustering compounds to discover new structures possibly having similar biological activities. It still has some limitations that the specific biological activity or efficacy cannot be directly predicted, since the output is usually a new representation or classification of the data, rather than direct activity prediction.

The early deep learning mainly involves structures such as multi-layer perceptron (MLP), convolutional neural network (CNN) and simple recurrent neural network (RNN). These models are used to predict characteristics such as biological activity of the molecules or toxicity of drugs by learning complex nonlinear relationships from a large number of data. These models automatically extract features from the data through cascading linear and nonlinear processing layers. However, it still has some limitations as follows:
1. No zero-shot learning ability: zero-shot learning refers to the ability of the model to predict unseen categories without direct experience. The early deep learning models usually cannot accurately predict new biological targets or compounds without training data since they heavily rely on the data provided during training and lack the ability of generalizing the learned knowledge to a new situation.

2. No attention mechanism: the attention mechanism allows the model to dynamically focus on the most relevant information part when processing data. Early deep learning architectures (such as initial CNN and RNN) lack such a mechanism, which limits their efficiency and accuracy in processing complex biological data with multiple key features. For example, in molecular structures of the drugs, some specific parts possibly contribute more to the activity than others, but the early models cannot effectively identify and give priority to these key areas.

The GANs are to train two networks (a generator and a discriminator) to generate new molecular structures conforming to chemical rationality. The generator tries to create new compounds, while the discriminator evaluates authenticity and effectiveness of these compounds. However, it still has some limitations as follows:

1. The generated compounds are possibly not feasible in actual chemical synthesis or biological application, since the structures generated by the GANs possibly do not consider the synthetic feasibility or biological stability of the molecules.
2. When training the GANs, the problem of mode collapse possibly occurs. This means that the generator begins to generate very similar or identical outputs, rather than diverse data. The mode collapse usually occurs when the generator finds a specific output strategy that can "cheat" the discriminator, and then repeats this strategy all the time. In drug design, this means that the generated compounds are possibly too single to cover a wide enough chemical space, thus limiting the application effect of the GANs in discovering new drug candidate molecules.

In summary, there are still shortcomings in the related art, such as lower calculation efficiency and poorer design success rate, leading to great challenges and high costs in the research and development of new drugs.

SUMMARY

In order to overcome the above shortcomings of the related art, an objective of the disclosure is to provide a drug design method based on an autoregressive model, to improve the efficiency and success rate of drug design.

In order to achieve the above objective, the technical solution adopted by the disclosure is as follows.

A drug design method based on an autoregressive model includes:

acquiring a ligand data set and a protein ligand data set, training protein information in the protein ligand data set by using a sub-word tokenization algorithm to obtain a protein tokenizer, and training ligand information in the ligand data set by using the sub-word tokenization algorithm to obtain a ligand tokenizer; and constructing a tokenizer of the autoregressive model by using the protein tokenizer and the ligand tokenizer;

processing and transforming original data in the ligand data set and the protein ligand data set into a text form suitable for the autoregressive model to obtain text data, and encoding the text data by the tokenizer of the autoregressive model to construct a training data set required by the autoregressive model;

training the autoregressive model by using the training data set to obtain a trained autoregressive model, so that the autoregressive model is configured to understand and learn an interaction mode between a protein and a ligand;

generating predicted ligand data by using the trained autoregressive model, and post-processing the predicted ligand data through a chemical or biological information tool to obtain candidate ligands each with a chemical structure; and evaluating and optimizing the candidate ligands, specifically including: performing structural optimization and activity prediction on the candidate ligands by using the chemical or biological information tool, to determine target candidate molecules.

In an embodiment, the ligand data set is provided by a data set ZINC, Public chemical database (PubChem), chemistry of biodiversity database (ChEMBL) or DrugBank, the ligand information is extracted for learning a representation of the ligand, and a data format of the representation of the ligand is a simplified molecular input line entry system (SMILES) format. The protein ligand data set is provided by a data set BindingDB, PDBbind, biological lipid database (BioLIP) or binding database of molecular affinity data (BindingMOAD), the protein information is extracted for learning a representation of an amino acid sequence of the protein, and protein ligand pair information is extracted for learning a corresponding relationship between the protein and the ligand, a data format of the representation of the amino acid sequence of the protein is an FASTA format, and a data format of the corresponding relationship between the protein and the ligand is the SMILES format.

In an embodiment, objects used by the sub-word tokenization algorithm include: a text form representation of the ligand, a text form representation of the protein and a text form representation jointly formed by the protein and the ligand. The sub-word tokenization algorithm decomposes a rare word into meaningful sub-words without dividing a common word into smaller sub-words. Specifically, the rare word is a word that appears less frequently in the training data set, usually appearing only a few times or even once; and the common word is a word that appears frequently in the training data set.

In an embodiment, a SMILES format of a ligand in a jglaser/binding_ data set is trained by using a byte pair encoding (BPE) algorithm in the sub-word tokenization algorithm to obtain the ligand tokenizer. The ligand tokenizer comprises a vocab.json storage vocabulary and a merges.txt storage and merging operation of the ligand, and a size of the vocab.json storage vocabulary is 3560. A size of a vocabulary of the protein is set to 50000, and an amino acid sequence of a protein in a jglaser/binding_affinity data set is trained by using the BPE algorithm to obtain the protein tokenizer; the protein tokenizer comprises a vocab.json storage vocabulary and a merges.txt storage and merging operation of the protein. When constructing the tokenizer of the autoregressive model, a merging operation is performed on the vocab.json storage vocabularies of the ligand and the protein, a same word and a same word with different merging operations are deleted, after deleting a repeated word, most initial 256 characters in the BPE algorithm are supplemented as words to make up for a vacancy caused by deleting the repeated word, and after processing, a size of a vocabulary of the tokenizer of the autoregressive model is 53080.

In an embodiment, the training data set includes a ligand text data set and a protein ligand pair text data set, the ligand text data set and the protein ligand pair text data set are transformed from the ligand data set and the protein ligand data set, respectively, and specifical transforming steps include:

extracting the ligand information from the ligand data set and transforming the ligand information into ligand text data, and generating the ligand text data set by the tokenizer of the autoregressive model, so that the autoregressive model understands the representation of the ligand; and extracting the protein ligand pair information from the protein ligand data set and transforming the protein ligand pair information into protein ligand pair text data, and generating the protein ligand pair text data set by the tokenizer of the autoregressive model, so that the autoregressive model is configured to capture potential characteristics and an activity relationship of the chemical structure of each of the candidate ligands to generate a target compound with drug activity.

In an embodiment, when constructing the ligand text data set, a SMILES sequence is extracted from a zinc20 data set, and the SMILES sequence is transformed into the ligand text data in a format of '<|startoftext|>'+'<L>'+SMILES sequence+'<|endoftext|>'; and the ligand text data is encoded by the tokenizer of the autoregressive model to form the ligand text data set. When constructing the protein ligand pair text data set, protein ligand pair information is extracted from the jglaser/binding_affinity data set to obtain a protein ligand pair, and an amino acid sequence of a protein and a SMILES format of a ligand of the protein ligand pair are transformed into the protein ligand pair text data in a format of '<|startoftext|>'+'<P>'+the amino acid sequence of the protein in the protein ligand pair+'<L>'+the SMILES format of the ligand in the protein ligand pair+'<|endoftext|>'; and the protein ligand pair text data is encoded by using the tokenizer of the autoregressive model.

In an embodiment, the training the autoregressive model includes:
selecting an autoregressive model GPT-2 as a basic model, and performing model training on the autoregressive model GPT-2 by using a deep learning framework PYTORCH; and inputting a sequence of the protein ligand pair text data set into the autoregressive model GPT-2; where a target output corresponding to each input data element is a next element in the sequence of the protein ligand pair text data set.

In an embodiment, the generating predicted ligand data by using the trained autoregressive model includes:
when predicting a ligand of a specific protein, inputting an amino acid sequence or a FASTA format of the specific protein, and outputting a SMILES format of each of the predicted ligands for the amino acid sequence of the specific protein; and in response to the amino acid sequence of the specific protein and part of a ligand of the specific protein being known, when predicting rest of the ligand of the specific protein, based on inputting the amino acid sequence or the FASTA format of the specific protein, inputting the known part of the ligand of the specific protein, and outputting the SMILES format of each of the predicted ligands with a specific start.

In an embodiment, the autoregressive model is deployed locally or on a Web end, and the autoregressive model GPT-2 based on a Hugging Face data set is adopted as a core. The amino acid sequence of the protein is used as an input, and a corresponding drug molecular sequence is generated by using the autoregressive model GPT-2. The drug molecular sequence is output by the GPT-2 autoregressive model as the SMILES format, the drug molecular sequence with the SMILES format is screened by Open Babel to eliminate unreasonable drug generation, and is transformed to a structure data file (SDF) format by the Open Babel.

In an embodiment, the chemical or biological information tool includes the Open Babel and RDKIT.

Compared with the related art, the above drug design method based on the autoregressive model according to the embodiments of the disclosure has the following beneficial effects.

In the disclosure, the GPT-like model is used to carry out autoregressive training on the protein ligand pairs with known interaction, so that the autoregressive model can capture potential chemical structure characteristics and activity relationships, thereby generating new compounds with potential drug activity. Particularly, in the drug design based on the autoregressive model, the tokenizers are constructed to process and understand the chemical and biological sequence data, that is, the advanced sub-word tokenization algorithm BPE is used to realize the tokenizers. The algorithm analyzes the specific mode of the protein sequence and the ligand chemical structure, to automatically recognize and merge high-frequency character pairs or character combinations, thus forming an efficient and compact vocabulary. By specially making the tokenizers for the drug design process, the ability of the model to process complex chemical and biological sequence data is significantly improved, thus improving the accuracy of predicting drug molecular structures. Moreover, by optimizing the size and structure of the vocabulary, computational complexity of the model is reduced and the efficiency of the training and prediction processes is improved.

Furthermore, since the autoregressive generation method shows higher flexibility in the drug design strategies, and the autoregressive generation method relies on output of the model as input for prediction, the autoregressive model can better capture the chemical structure and the activity relationship, thus improving quality of the generated compounds, that is, ensuring a success rate of drug design. In addition, since the autoregressive generation method is more stable than the GANs in the training process, it can be optimized and adjusted more easily, thus improving the efficiency of drug design.

In addition, these new compounds possibly have unique chemical structures and action mechanisms, which can explore the chemical space more effectively and provide a wider range of candidate compounds for drug research and development compared with the related art.

DETAILED DESCRIPTION OF EMBODIMENTS

In order to make the objective, technical solution and advantages of the disclosure more clear, the disclosure will be further described in detail in combination with the drawings and embodiments. It should be understood that the specific embodiments described herein are only used to explain the disclosure, and are not used to limit the disclosure.

Proteins are one of the most basic molecules in life system, and they play many important functions in cells. The proteins are usually formed by one or more polypeptide chains, which can interact with other molecules through hydrogen bonds, ionic bonds, van der Waals forces and other interaction forces. The small molecules that interact with the proteins are called ligands. This interaction is very special since it can change the conformation of the proteins, thus affecting functions of the proteins. For example, drugs usually exert their effects by binding with the proteins. Therefore, it is very important to study the interaction of the proteins and ligands for drug design.

In order to improve the efficiency and success rate of drug design, the embodiment of the disclosure provides a drug design method based on an autoregressive model, which includes the following steps 1-4.

In step 1, a sub-word tokenization algorithm is applied to biological text processing, protein information and ligand information in data sets are trained to obtain a protein tokenizer and a ligand tokenizer, and on this basis, a tokenizer of the autoregressive model is constructed.

In step 2, original data in the data sets are processed and transformed into a text form suitable for the autoregressive model to obtain text data, and the text data is encoded by the tokenizer of the autoregressive model, to thereby construct a training data set required by the autoregressive model.

In step 3, the autoregressive model is trained by the training data set, so that the autoregressive model is configured to understand and learn an interaction mode between a protein and a ligand.

In step 4, predicted ligands are generated by using the trained autoregressive model, and are post-processed by using a chemical or biological information tool to obtain candidate ligands each with a specific chemical structure. The candidate ligands are evaluated and optimized, and structural optimization and activity prediction are performed on the candidate ligands by using the chemical or biological information tool, to determine target candidate molecules with a potential to become effective drugs.

For the above step 1, the embodiment of the disclosure provides a new method for constructing tokenizers in the field of drug design, particularly in the drug design method based on the autoregressive model. Considering particularity of the drug design field, including the structural complexity of the ligand and protein and the high demand on accuracy in the process of drug design, the embodiment of the disclosure processes and understands chemical and biological sequence data by constructing special tokenizers. This method is proposed based on improving the accuracy and efficiency of the autoregressive model in the processing of chemical structures and biological sequence data, and optimizing a computational burden in the drug design process.

The embodiment of the disclosure adopts the advanced sub-word tokenization algorithm (for example, BPE or WordPiece) to realize the tokenizers. The algorithm analyzes the specific mode of a protein sequence and a ligand chemical structure, to automatically recognize and merge high-frequency character pairs or character combinations, thus forming an efficient and compact vocabulary. In addition, the embodiment of the disclosure also includes a series of training steps, and uses the protein and ligand data in a large biological information database to train the tokenizers to ensure that they can accurately reflect the characteristics of biochemical data.

In order to realize the tokenizers, the embodiment of the disclosure adopts an implementation method based on a hugging face tokenizers data set. Through this method, the tokenization algorithm can be flexibly customized and optimized to adapt to different characteristics of biochemical data. Specifically, using an application programming interface (API) interface provided by the data set, researchers can customize the vocabularies according to the SMILES representation of the ligand and the amino acid sequence of the protein, and then construct a tokenizer of the autoregressive model specifically optimized for drug design.

Remarkable advantages and benefits of achieving the tokenizers by the embodiment of the disclosure are as follows. Firstly, by specially making the tokenizers for the drug design process, the ability of the model to process complex chemical and biological sequence data is significantly improved, thereby improving the accuracy of predicting the drug molecular structures. Secondly, this method reduces computational complexity of the model and improves efficiency of the training and prediction processes by optimizing the sizes and structures of the vocabularies. In addition, the embodiment of the disclosure can also provide a more accurate and efficient tool for drug researchers, which helps them find new drug candidates with a potential value in the process of drug design and development, accelerate the research and development cycle of new drugs, and reduce the research and development costs.

For the above step 2, the embodiment of the disclosure provides an efficient data processing method, aiming at transforming the original data in drug research into a format suitable for training the autoregressive model. In view of the advantages of the autoregressive model in a generation task, especially in the field of drug design, the next possible compound structure can be predicted based on the given sequence data. The purpose of the step 2 is to provide high-quality and efficient training data for these models. By optimizing the data processing flow, it is aimed to improve the efficiency of model training and the quality of generated compounds.

The embodiment of the disclosure adopts a series of technical steps to process the original data to form a text data training set, which is suitable for training requirements of the autoregressive model. First, the original data (including SMILES character strings of the ligand and the amino acid sequence of the protein) is preprocessed and transformed into a unified text format. Then, these text data are encoded by using the tokenizer of the autoregressive model constructed in step 1 to generate the training data set that can be directly used by the autoregressive model. This process includes transforming chemical and biological information sequences into a series of recognizable symbols or labels, and these symbols or labels are used by the autoregressive model to learn the structural characteristics and biological activities of the compounds.

In order to realize the text data training set (i.e., the training data set), the embodiment of the disclosure utilizes advanced programming languages, data processing libraries (such as PYTHON and PANDAS and NUMPY in the ecosystem thereof) and specific tokenization tools (such as the tokenizers data set of hugging face). The flexibility and powerful functions of these tools make it feasible and efficient to extract, transform and encode data from the original data of different sources and formats.

Through accurate and efficient data processing steps, the embodiment of the disclosure brings many advantages and benefits when realizing the text data training set. Firstly, quality and consistency of the training data are ensured, which is very important for training the high-performance autoregressive model. Secondly, through the optimized data encoding process, the time and resources needed for model training are reduced, and the speed of new drug discovery is accelerated.

For the above step 3, the embodiment of the disclosure captures and understands the complex interaction mode between the protein and the ligand by using the advanced autoregressive model. In the field of drug design, it is very important to accurately predict the interaction between the protein and the ligand in order to identify effective drug molecules. Traditional methods often rely on time-consuming experimental methods or costly simulations. The embodiment of the disclosure directly learns these interaction modes from large-scale biochemical data by training the autoregressive model, aiming at improving the efficiency and accuracy of drug candidate discovery.

The step 3 explains the training process of the autoregressive model in detail, and the key is to train the model by using a specially pretreated protein ligand text data set. The training goal is to enable the autoregressive model to accurately predict the next element of a given sequence, so as to learn the interaction mode between the protein and the ligand. The process also involves randomly distributing each data set into a training set and a verification set, the training set is used for learning of the autoregressive model, and the verification set is used for evaluating a learning effect of the autoregressive model.

For the model selection and training framework during model training, an autoregressive model framework suitable for processing sequence data is selected, such as Transformer or GPT series model. In the embodiments of the disclosure, GPT-2 is selected as a basic framework of the autoregressive model, which considers excellent performance of GPT-2 in processing the sequence data. The autoregressive model can be realized and trained by using a PYTORCH deep learning data set. PYTORCH provides the flexible API and efficient computing power, and supports rapid development and training of the autoregressive model.

For the training process and optimization strategy during model training, in the model training process, the embodiments of the disclosure adopt a series of optimization strategies to improve training efficiency and model performance. Firstly, an appropriate optimizer (such as adaptive moment estimation abbreviated as Adam or stochastic gradient descent abbreviated as SGD) is selected to minimize a loss function, which is very important for fast convergence and avoiding over-fitting. Secondly, the training process is further optimized by carefully configuring training parameters (such as learning rate, batch size and training period) and implementing the strategy of dynamically adjusting the learning rate. A segmentation strategy of the data set ensures the generalization ability of the model on various data, and a training state of the model can be effectively monitored and adjusted by learning on the training set and evaluating on the verification set.

In order to realize the training of the model, the embodiments of the disclosure can adopt various machine learning and deep learning frameworks, such as TENSORFLOW or PYTORCH, and these tools provide flexible and powerful APIs to support the design, training and verification of the autoregressive model. In addition, the development and experiment process can be further accelerated by using the existing model libraries such as hugging face transformers, and these libraries provide pre-training models and training skills and help to improve the model performance.

The model training of the embodiment of the disclosure shows several key advantages as follows.

(1) Efficient learning and accuracy improvement: by accurately training the autoregressive model, the embodiments of the disclosure can deeply understand the complex interaction between the protein and the ligand, and significantly improve the support strength of drug design. By using the ability of deep learning, the model can accurately learn these interaction modes, thus improving the prediction accuracy of drug candidates.

(2) Performance and efficiency optimization: the embodiments of the disclosure make the model training process more efficient and quickly reaches an expected performance level through the optimized training strategy and parameter adjustment. Compared with traditional drug discovery methods, large-scale data sets can be processed faster, and the identification process of the drug candidates with a potential value is accelerated.

(3) Flexibility and scalability: the GPT-2 and PYTORCH are selected as implementation tools, which not only ensures strong performance of the model, but also provides a high degree of flexibility and scalability for future research and application. The selection of the technical framework provides a broad application prospect for drug design, so that new drug molecules can be explored, and new fields possibly not discovered by traditional methods are revealed.

For the above step 4, the embodiments of the disclosure screen the candidate ligands with practical application potential from a large number of ligand data generated by the autoregressive model through a series of highly specialized ligand post-processing steps. These steps solve the problems of low efficiency and low success rate in the traditional drug discovery process. In combination with the calculation model and the chemoinformatics tools, the ligand candidates with drug activity can be quickly and accurately identified and optimized. This method is proposed based on that the automatic and intelligent post-processing process can not only significantly accelerate a screening process of the drug candidates, but also improve the accuracy and reliability of the screening process.

Ligand generation in the embodiment of the disclosure is as follows. The trained autoregressive model is used to generate the SMILES format data of the predicted ligands based on an amino acid sequence of a specific protein or known partial ligand information.

Ligand post-processing in the embodiment of the disclosure is as follows. The generated ligands are preliminarily screened by using the chemoinformatics tools, the ligands with unreasonable chemical structures are eliminated, and the candidate ligands with reasonable structures are retained, and are transformed into the SDF formats.

Evaluation and optimization of the candidate ligands in the embodiment of the disclosure are as follows. 3D conformation generation is carried out on the candidate ligands in the SDF formats, and the candidate molecules with a potential to become effective drugs are further screened through methods such as stereochemical analysis and synthetic feasibility evaluation.

In the embodiment of the disclosure, the chemoinformatics tools such as Open Babel and RDKIT are adopted in the ligand generation and post-processing stages. These tools can accurately analyze and transform the chemical structure of the data in the SMILES format, which ensures the rationality of the chemical structures and the feasibility of the molecules of the candidate ligands. In the model training and ligand generation stages, the deep learning framework such as PYTORCH is adopted to support complex autoregressive model structure and efficient model training.

Advantages and benefits of ligand generation and post-processing of the embodiment of the disclosure are as follows.

(1) Efficiency improvement: the efficiency of screening valuable candidates from a large number of chemical structures is greatly improved through automatic ligand generation and intelligent post-processing process.
(2) Accuracy enhancement: the ligands with reasonable chemical structures and drug activity potential can be identified more accurately in combination with the advanced calculation model and professional chemoinformatics tools.
(3) Flexibility and scalability: the prediction and screening processes are allowed to be customized according to different drug research and development needs, ensuring wide applicability and better scalability of the method.
(4) Comprehensive evaluation advantage: through multi-dimensional structural optimization and activity prediction, the embodiment of the disclosure not only considers the chemical rationality of the ligands, but also evaluates biological activity and synthesis feasibility of the ligands, thus providing a comprehensive scientific basis for drug research and development.

Figure 1:
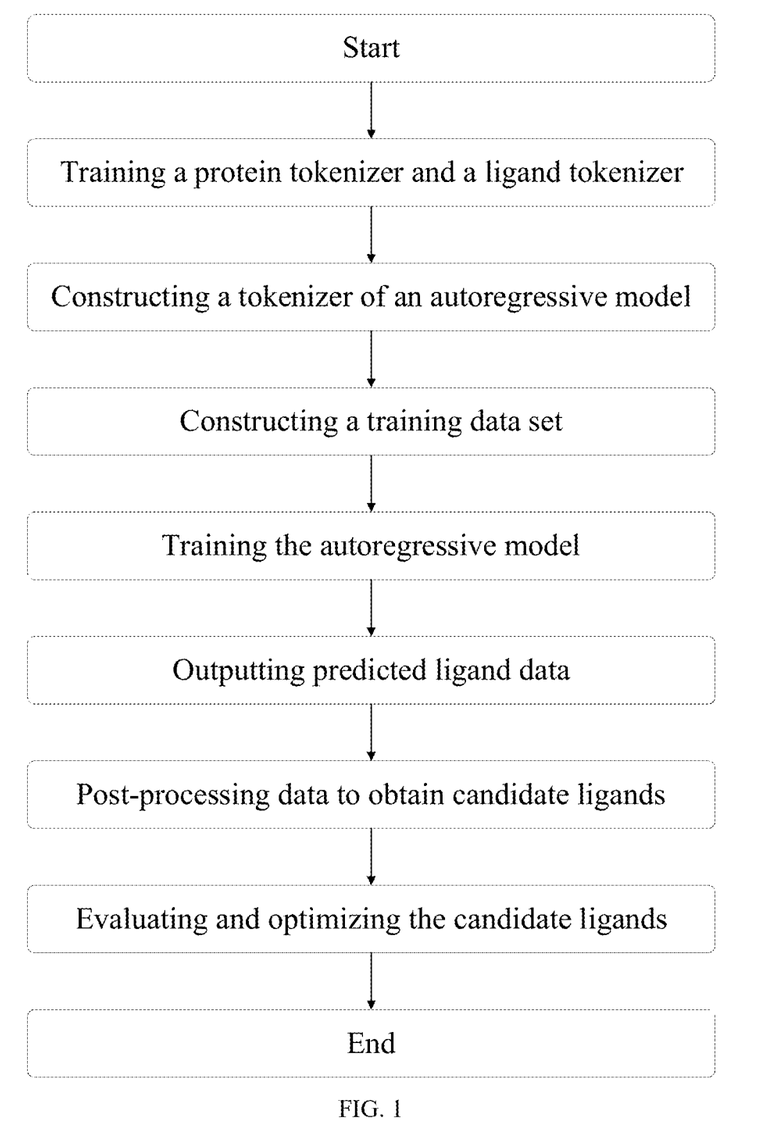
FIG. 1 illustrates an overall flowchart of a drug design method based on an autoregressive model according to an embodiment of the disclosure.
Figure 2:
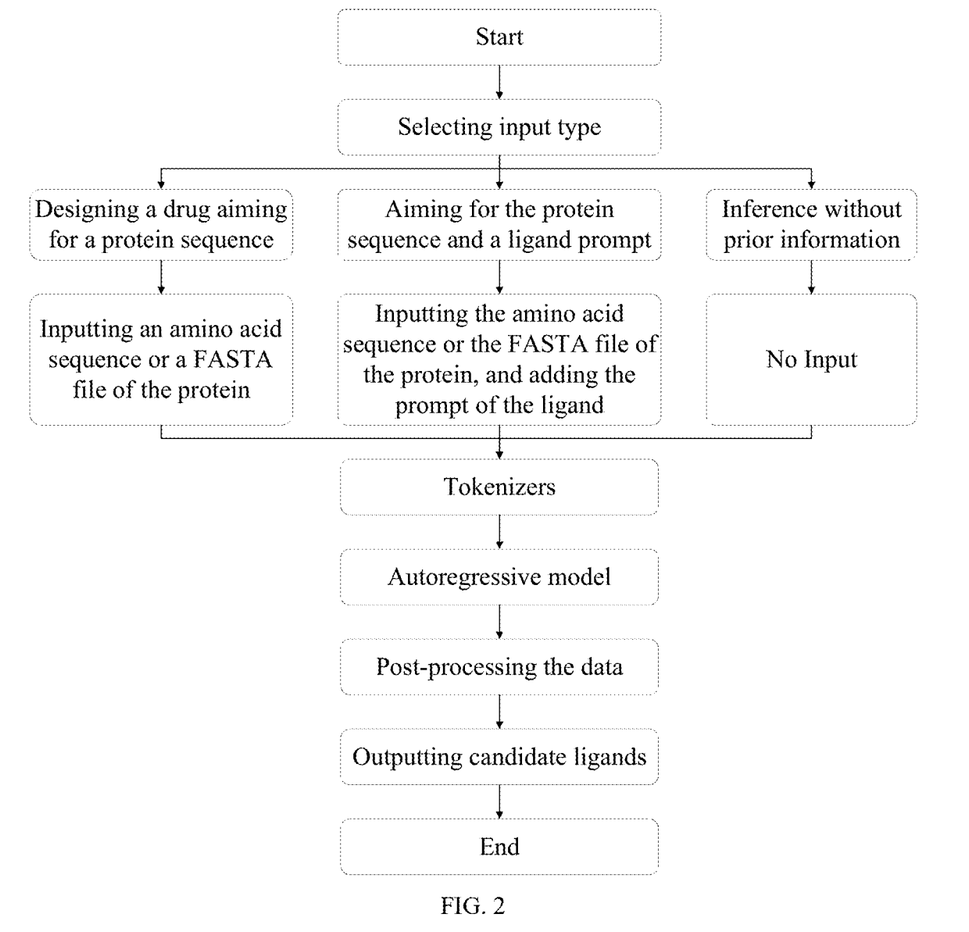
FIG. 2 illustrates a concrete operation flowchart of the drug design method based on the autoregressive model according to an embodiment of the disclosure.

In combination with FIG. 1 and FIG. 2, the following steps 1-4 specifically included by the embodiment of the disclosure are explained in detail.

In step 1, a tokenizer of an autoregressive model is constructed.

In step 1.1, a ligand data set and a protein ligand data set are acquired, and ligand information in the ligand data sets is trained by using a sub-word tokenization algorithm to construct a ligand tokenizer, that is, a labeled ligand vocabulary is constructed.

In step 1.2, protein information in the protein ligand data sets is trained by using the same sub-word tokenization algorithm as step 1.1, to obtain a protein tokenizer, that is, a labeled protein vocabulary is obtained.

In step 1.3, the tokenizer of the autoregressive model is constructed through content of the ligand tokenizer and content of the protein tokenizer. Specifically, the vocabularies (i.e., the ligand vocabulary and the protein vocabulary) of the tokenizers obtained in steps 1.1 and 1.2 are merged, and repeated words in the merged vocabulary are deleted to obtain the tokenizer of the autoregressive model. That is, the labeled ligand vocabulary and the labeled protein vocabulary are merged and the repeated words are deleted from the merged vocabulary to form a vocabulary for the autoregressive model.

In the embodiment of the disclosure, the ligand data set is provided by ZINC, PubChem, ChEMBL or DrugBank, the ligand information is extracted for learning a representation of the ligand, and the data format of the representation of the ligand is a SMILES format. The protein ligand data set is provided by BindingDB, PDBbind, BioLIP or BindingMOAD, the protein information is extracted to learn a representation of an amino acid sequence of the protein, meanwhile, protein ligand pair information is extracted for learning a corresponding relationship between the protein and the ligand, and the data formats are an FASTA format and the SMILES format, respectively.

The sub-word tokenization algorithm is a technical application in natural language processing tasks, which typically includes: BPE, byte-level BPE, WordPiece, Unigram and SentencePiece. The sub-word tokenization algorithm may also include improvements on the basis of common sub-word tokenization algorithms, such as the improvement on the BPE algorithm, which possibly includes removing unused characters from an initial character set or customizing the initial character set. A main idea of the sub-word tokenization algorithm is to decompose rare words into meaningful sub-words, without dividing common words, that is, without dividing the common words into smaller sub-words. The embodiment of the disclosure applies the algorithm to the field of drug design for processing biological texts, for example, the biological texts include the SMILES format of the ligand and the text data of protein sequence (i.e., the amino acid sequence of the protein). In the embodiment of the disclosure, the objects used by the sub-word tokenization algorithm include a text form representation of the ligand, a text form representation of the protein and a text form representation jointly formed by the protein and the ligand.

In step 2, a text data set (that is, a training data set) is constructed. The original data are transformed into a text form suitable for the autoregressive model to obtain text data, and then the text data is encoded by the tokenizer of the autoregressive model, to construct the training data set needed by the autoregressive model.

In step 2.1, a ligand text data set is constructed.

The ligand information is extracted from the ligand data set, and each sequence of the ligand information is transformed into ligand text data. Then, the ligand text data is encoded by the tokenizer of the autoregressive model obtained by the sub-word tokenization algorithm in step 1, to form the ligand text data set to help the model understand the representation of the ligand.

In step 2.2, a protein ligand pair text data set is constructed.

Protein ligand pair information is extracted from the protein ligand data set and transformed into protein ligand pair text data. Then, the tokenizer of the autoregressive model is used to encode the protein ligand pair text data to generate the protein ligand pair text data set, thereby helping the autoregressive model to capture the potential characteristics and activity relationship of chemical structures to generate new compounds with potential drug activity.

The construction of the protein ligand pair text data set is taken as an example as follows.

Protein PI3Kα interacts with ligand BYL719 thereof, thus forming a protein ligand pair. The amino acid sequence of PI3Kα is as follows (also shown in

SEQ ID NO: 1):
MPPRPSSGELWGIHLMPPRILVECLLPNGMIVTLECLREATLITIKHEL

FKEARKYPLHQLLQDESSYIFVSVTQEAEREEFFDETRRLCDLRLFQPF

LKVIEPVGNREEKILNREIGFAIGMPVCEFDMVKDPEVQDFRRNILNVC

KEAVDLRDLNSPHSRAMYVYPPNVESSPELPKHIYNKLDKGQIIVVIWV

IVSPNNDKQKYTLKINHDCVPEQVIAEAIRKKTRSMLLSSEQLKLCVLE

YQGKYILKVCGCDEYFLEKYPLSQYKYIRSCIMLGRMPNLMLMAKESLY

SQLPMDCFTMPSYSRRISTATPYMNGETSTKSLWVINSALRIKILCATY

VNVNIRDIDKIYVRTGIYHGGEPLCDNVNTQRVPCSNPRWNEWLNYDIY

IPDLPRAARLCLSICSVKGRKGAKEEHCPLAWGNINLFDYTDTLVSGKM

ALNLWPVPHGLEDLLNPIGVTGSNPNKETPCLELEFDWFSSVVKFPDMS

VIEEHANWSVSREAGFSYSHAGLSNRLARDNELRENDKEQLKAISTRDP

LSEITEQEKDFLWSHRHYCVTIPEILPKLLLSVKWNSRDEVAQMYCLVK

DWPPIKPEQAMELLDCNYPDPMVRGFAVRCLEKYLTDDKLSQYLIQLVQ

VLKYEQYLDNLLVRFLLKKALTNQRIGHFFFWHLKSEMHNKTVSQRFGL
LLESYCRACGMYLKHLNRQVEAMEKLINLTDILKQEKKDETQKVQMKFL
VEQMRRPDFMDALQGFLSPLNPAHQLGNLRLEECRIMSSAKRPLWLNWE
NPDIMSELLFQNNEIIFKNGDDLRQDMLTLQIIRIMENIWQNQGLDLRM
LPYGCLSIGDCVGLIEVVRNSHTIMQIQCKGGLKGALQFNSHTLHQWLK
DKNKGEIYDAAIDLFTRSCAGYCVATFILGIGDRHNSNIMVKDDGQLFH
IDFGHFLDHKKKKFGYKRERVPFVLTQDFLIVISKGAQECTKTREFERF
QEMCYKAYLAIRQHANLFINLFSMMLGSGMPELQSFDDIAYIRKTLALD
KTEQEALEYFMKQMNDAHHGGWTTKMDWIFHTIKQHALN.

The SMILES representation of the ligand BYL719 is as follows:

CC1=C(SC(=N1)NC(=O)N2CCCC2C(=O)N)C3=CC(=NC=C3)C(C)(C)C(F)(F)F.

The method of transforming the protein ligand pair information into the protein ligand pair text data is as follows:

'<|startoftext|>'+'<P>'+the amino acid sequence of protein in the pair+'<L>'+SMILES representation of ligand in the pair+'<|endoftext|>'

Therefore, the transforming result of the pair of the protein PI3Kα and the ligand BYL719 is as follows:

<|startoftext|><P>MPPRPSSGELWGIHLMPPRILVECLLPNGMI
VTLECLREATLITIKHELFKEARKYPLHQLLQDESSYIFVSVTQEAERE
EFFDETRRLCDLRLFQPFLKVIEPVGNREEKILNREIGFAIGMPVCEFD
MVKDPEVQDFRRNILNVCKEAVDLRDLNSPHSRAMYVYPPNVESSPELP
KHIYNKLDKGQIIVVIWVIVSPNNDKQKYTLKINHDCVPEQVIAEAIRK
KTRSMLLSSEQLKLCVLEYQGKYILKVCGCDEYFLEKYPLSQYKYIRSC
IMLGRMPNLMLMAKESLYSQLPMDCFTMPSYSRRISTATPYMNGETSTK
SLWVINSALRIKILCATYVNVNIRDIDKIYVRTGIYHGGEPLCDNVNTQ
RVPCSNPRWNEWLNYDIYIPDLPRAARLCLSICSVKGRKGAKEEHCPLA
WGNINLFDYTDTLVSGKMALNLWPVPHGLEDLLNPIGVTGSNPNKETPC
LELEFDWFSSVVKFPDMSVIEEHANWSVSREAGFSYSHAGLSNRLARDN
ELRENDKEQLKAISTRDPLSEITEQEKDFLWSHRHYCVTIPEILPKLLL
SVKWNSRDEVAQMYCLVKDWPPIKPEQAMELLDCNYPDPMVRGFAVRCL
EKYLTDDKLSQYLIQLVQVLKYEQYLDNLLVRFLLKKALTNQRIGHFFF
WHLKSEMHNKTVSQRFGLLLESYCRACGMYLKHLNRQVEAMEKLINLTD
ILKQEKKDETQKVQMKFLVEQMRRPDFMDALQGFLSPLNPAHQLGNLRL
EECRIMSSAKRPLWLNWENPDIMSELLFQNNEIIFKNGDDLRQDMLTLQ
IIRIMENIWQNQGLDLRMLPYGCLSIGDCVGLIEVVRNSHTIMQIQCKG
GLKGALQFNSHTLHQWLKDKNKGEIYDAAIDLFTRSCAGYCVATFILGI
GDRHNSNIMVKDDGQLFHIDFGHFLDHKKKKFGYKRERVPFVLTQDFLI
VISKGAQECTKTREFERFQEMCYKAYLAIRQHANLFINLFSMMLGSGMP
ELQSFDDIAYIRKTLALDKTEQEALEYFMKQMNDAHHGGWTTKMDWIFH
TIKQHALN<L>CC1=C(SC(=N1)NC(=O)N2CCCC2C(=O)N)
C3=CC
(=NC=C3)C(C)(C)C(F)(F)F</endoftext|>.

The protein ligand pair text data are tokenized by using the tokenizer of the autoregressive model constructed in step 1, and the result is as follows:

['<|startoftext|>', '<', 'P', '>', 'MPP', 'RPS', 'S',
'GELWGIHLMPPRILVECLLPNGMIVTLECLREA', 'TLITIKH', 'ELFKEARK',
'YPLHQLL', 'QD', 'ES', 'S',
'YIFVSVTQEAEREEFFDETRRLCDLRLFQPFLKVIEPVGNREEKILNREI',
'GFAIGM', 'PVCEFDMVKDPEVQDFRRNILNVC',
'KEAVDLRDLNSPHSRAMYVY', 'PPN', 'VES', 'S',
'PELPKHIYNKLDKGQIIVVIW', 'VIVS', 'PNNDK', 'QKYTL', 'KIN', 'H', 'DCVPE',
'QVIA', 'EAIR', 'KKTRS', 'MLLS', 'S', 'EQL', 'KLCVLEYQ',
'GKYILKVCGCDEYFLEKY', 'PLSQYK', 'YI', 'RSC', 'T', 'ML',
'GRMPNLMLMAKESL', 'YSQL', 'PMDCFT', 'MPSYSRRISTATPYMN', 'GETS',
'TK', 'SLW', 'VIN', 'S', 'AL', 'RIKIL', 'CATYVN',
'VNIRDIDKIYVRTGIYHGGEPLCDNVNTQRVPCSNPRWNEWLNYDIYIPDLPR
AARLCLSICS', 'VKGRK', 'GAKEE', 'HC', 'PLA', 'W',
'GNINLFDYTDTLVSGKMALNLWPVPHGLEDLLNPIGVTGSNPNKETPCLELE
FDWFSSVVKFPDMSVIEEHAN', 'WSVS', 'REA', 'GF', 'S',
'YSHAGLSNRLARDNELRENDKE', 'QLKAIS', 'TRD', 'PLSEITEQEKDFLWSHRH',
'YCVTIPE', 'ILPK', 'LLLS', 'VK', 'WN', 'S', 'RDE', 'VAQMYCL', 'VKDWPPIK', -continued

```
'PEQA', 'ME', 'LLDC', 'NY', 'PDPM', 'VRGFA',

'VRCLEKYLTDDKLSQYLIQLVQVLKYEQYLDNLLVRFLLKKALTNQRIGHFF

FWHLKSEMHNKTVSQRFGLLLESYCRACGMYLKHLNRQVEAMEKLINLTDI

LKQEKKDETQKVQMKFLVEQMRR',

'PDFMDALQGFLSPLNPAHQLGNLRLEEC', 'RI', 'MS', 'SA', 'KR',

'PLWLNWENPDIMSELLFQNNEIIFKNGDDLRQDMLTLQIIRIMENIWQNQGLD

LRMLPYGCLSIGDCV', 'GLIEVV', 'RN', 'S', 'HTIM', 'QIQC', 'KGGLKGAL', 'QF',

'NSHTLHQWLKDKNKGEIYDAAIDLFTRSCAGYCVATFILGIGDRHNSNIMVK

DDGQLFHIDFGHFLDHKKKKFGYKRERVPFVLTQDFLIVISK', 'GAQEC', 'TK',

'TREFERFQEMCYKAY', 'LAIRQHA', 'NLFI', 'NLF', 'S', 'MML',

'GSGMPELQSFDDIAYIRKTLALDKTEQEALE', 'YFMK',

'QMNDAHHGGWTTKMDWIFHTIKQHALN', '<', 'L', '>', 'CC', '1', '=', 'C', '(', 'SC', '(=',

'N', '1', ')', 'NC', '(=', 'O', ')', 'N', '2', 'CCCC', '2', 'C', '(=', 'O', ')', 'N',

')', 'C', '3', '=', 'CC', '(=', 'NC', '=', 'C', '3', ')', 'C', '(', 'C', ')(', 'C', ')',

'C', '(', 'F', ')(', 'F', ')', 'F', '</endoftext|>'].
```

In the above result, each word is enclosed by ' ' and separated by a comma.

For the above words, a corresponding token ID of a specific word may be found by looking up the vocabularies of the tokenizers in the step 1, and the token ID is an integer. Each token ID and a specific token have a one-to-one correspondence in the vocabularies. Each word in the protein ligand pair text data is transformed into the corresponding token ID, and these token IDs are arranged according to the order in the original text, thus completing the encoding process. The result is as follows:

[53082, 28, 48, 30, 1828, 745, 51, 16584, 16972, 16930, 16565, 353, 350, 51, 16579, 15247, 16445, 16402, 1740, 633, 51, 16411, 3591, 15953, 15991, 2037, 40, 16293, 15337, 4385, 15560, 5786, 51, 44137, 16545, 16417, 16317, 403, 2555, 41, 320, 16368, 14807, 16945, 16631, 6606, 372, 3301, 2260, 51, 262, 15797, 16310, 16530, 15774, 16462, 616, 765, 55, 16489, 16268, 665, 318, 51, 16985, 16988, 1492, 16394, 16318, 7433, 1112, 302, 510, 51, 1299, 16378, 16380, 4520, 359, 29665, 493, 35003, 16943, 16949, 16451, 346, 357, 451, 480, 16490, 11166, 340, 51, 16236, 16313, 16603, 490, 16606, 16953, 372, 16423, 16323, 2307, 5124, 51, 3671, 16437, 14846, 16630, 28, 44, 30, 49778, 17, 29, 35, 8, 49851, 49779, 46, 17, 9, 49783, 49779, 47, 9, 46, 18, 49802, 18, 35, 49779, 47, 9, 46, 9, 35, 19, 29, 49778, 49779, 49783, 29, 35, 19, 9, 35, 8, 35, 49793, 35, 9, 35, 8, 38, 49793, 38, 9, 38, 0].

Finally, after encoding, the integer that can be used by a computer for calculation is obtained, and then the autoregressive model can be trained on this basis.

In step 3, model training, that is, the autoregressive model is trained by using the constructed training data set, so that the autoregressive model can understand and learn the interaction mode between the protein and the ligand.

When training the autoregressive model, the protein ligand pair text data set obtained in step 2 is used in the training process, a sequence of the protein ligand pair text data set is input into the autoregressive model, and the target output corresponding to each input data element is the next element in the sequence of the protein ligand pair text data set. In the training process, the data sets (i.e., the protein ligand pair text data set and the ligand text data set) each are randomly scrambled and divided into a training set and a verification set. The training set is used to train the autoregressive model and the verification set is used to evaluate a training effect.

In an embodiment, the step 3 may be further described as follows.

In step 3.1, an autoregressive model GPT-2 is selected as a basic model, and a deep learning framework such as PYTORCH is used for training the autoregressive model GPT-2.

In step 3.2, an appropriate optimizer is selected to reduce the value of a loss function, and appropriate training parameters and training strategies are configured. The data sets each are divided into the training set and the verification set, and an appropriate batch size is used in the training process.

In step 4, the generated ligands are post-processed.

In step 4.1, the trained autoregressive model is used to generate predicted ligands, and the output SMILES format data (i.e., the SMILES representations of the ligands) is post-processed by a chemical or biological information tool to eliminate unreasonable ligands, to thereby obtain candidate ligands each with a specific chemical structure, and the candidate ligands are transformed into the SDF formats. The commonly used chemical information tools include Open Babel and RDKIT, which can judge the generated predicted ligand data and confirm whether they are reasonable.

When the trained autoregressive model is used for prediction, the prediction process depends on a specific application scenario. When predicting a possible ligand of a specific protein, an amino acid sequence or a FASTA format of the specific protein is input, and a SMILES format (i.e., a SMILES representation) of the ligand predicted for the amino acid sequence of the specific protein is output. In response to the amino acid sequence of the specific protein and a part of the ligand being known, when predicting rest of the ligand, the known part of the ligand (namely "prompt") may be input on the basis of inputting the amino acid sequence or the FASTA format of the specific protein, and the SMILES format of the predicted ligand with a specific start is output.

In step 4.2, the obtained candidate ligands are evaluated and optimized, and the chemical or biological information tools are used for structure optimization and activity prediction, so as to determine candidate molecules with a potential to become effective drugs. Specifically, the 3D conformation generation is performed on the SDF file, and the drug structure rationality is evaluated based on the aspects such as stereochemistry and synthesis feasibility.

In an embodiment, the above sub-word tokenization algorithm is a BPE tokenization algorithm, and steps thereof are as follows.

In step (1), a vocabulary is initialized. All characters in the text are taken as a basic unit to construct an initial vocabulary.

In step (2), a frequency of character pairs is counted. For given text data, the frequency of each adjacent character pair is counted.

In step (3), the high-frequency character pairs are merged. The character pairs with the highest frequency are selected and merged into a new character Meanwhile, the vocabulary and text data are updated, and the original character pair are replaced with the new character.

In step (4), steps (2)-(3) are repeatedly executed according to preset merging times or a vocabulary size until preset conditions are reached.

In an embodiment, the data sets are from a zinc20 data set and a jglaser/binding_affinity data set.

The ligand tokenizer uses the BPE algorithm to train the SMILES representation (i.e., the SMILES format) of the ligand in the jglaser/binding_affinity data set. The ligand tokenizer contains a vocab.json storage vocabulary and a merges.txt storage and merging operation of the ligand, and a size of the vocab.json storage vocabulary of the ligand is 3560.

In an embodiment, a size of a vocabulary of the protein is set to 50000, an amino acid sequence of the protein in the jglaser/binding_affinity data set is trained by the BPE algorithm to obtain the protein tokenizer, and the protein tokenizer includes a vocab.json storage vocabulary and a merges.txt storage and merging operation of the protein.

In an embodiment, when constructing the tokenizer of the autoregressive model, a merging operation is performed on the ligand vocabulary (i.e., the vocab.json storage vocabulary of the ligands) and the protein vocabulary (i.e. the vocab.json storage vocabulary of the proteins). The ligand information and the protein information are SMILES representations. Since there are characters in the SMILES representations coinciding with amino acid representations, it is necessary to process repeated words when merging the vocabularies, and check the vocab.json and merges.txt files of the ligand tokenizer and the protein tokenizer respectively to delete the same words and the same words with different merging operations. After processing the repeated words, the most initial 256 characters in the BPE algorithm are supplemented as words to make up for vacancies caused by deleting the repeated words. After processing, the vocabulary size of the tokenizer of the autoregressive model is 53080 (excluding special characters).

In an embodiment, when constructing the ligand text data set, SMILES sequences are extracted from the zinc20 data set, and each SMILES sequence is transformed into the ligand text data in the format of '<|startoftext|>'+'<L>'+SMILES sequence+'<|endoftext|>'. These text data is encoded by the tokenizer of the autoregressive model to form the ligand text data set. During training, 0.0001 of the zinc20 data set is randomly selected from each epoch as the training set, and the last 0.00001 of the zinc20 data set is used as the verification set.

In an embodiment, when constructing the protein ligand pair text data set, the protein ligand pair information is extracted from the jglaser/binding_affinity data set, and amino acid sequence of the protein and the SMILES representation of the ligand of each protein ligand pair are transformed into the protein ligand pair text data in the format of '<|startoftext|>'+'<P>'+the amino acid sequence of the protein in the protein ligand pair+'<L>'+SMILES representation of the ligand in the protein ligand pair+ '<|endoftext|>', and then the protein ligand pair text data is encoded by using the tokenizer of the autoregressive model. All data are used when training and verifying the protein ligand pair text data, and the training set and the verification set are divided according to a ratio of 9:1.

In an embodiment, an autoregressive language model uses the GPT-2 model based on the Hugging Face library as a core of the method to design drugs for a specific protein. With the protein sequence as input, the corresponding drug molecular sequence (such as the SMILES representation) is generated by using a GPT-2LMHeadModel model. By training and optimizing the GPT-2LMHeadModel model, candidate molecules with potential drug activity are generated, thus improving the efficiency and success rate of drug design.

In an embodiment, the model training adopts transformers and datasets libraries developed by Hugging Face team, the GPT-2LMHeadModel in the transformers library is selected as the basic model, and PYTORCH is used for training. Parameters such as AdamW optimizer, learning rate of 5e-4, preheating steps of 100 and epsilon value of 1e-8 are adopted. The data sets each are divided into the training set and the verification set according to the ratio of 9:1, the batch size of 8 is adopted for training, and the learning rate is adjusted by using a linear preheating strategy (get_linear_schedule_with_warmup).

In an embodiment, during model training, it is necessary to define a loss function L $(y, \hat{y})$, where y is a real sequence, and $\hat{y}$ is a sequence generated by the model, and this function may be expressed as negative logarithmic likelihood of conditional probability. In the training process, the model parameter θ is optimized by a gradient descent method to minimize the loss function.

In an embodiment, the model output is in the SMILES format, screened by the Open Babel to eliminate unreasonable drug generation, and then transformed to the SDF format by the Open Babel. However, the name of the drug file generated by directly using the SMILES format possibly causes a file name to be too long, which is possibly limited by a file naming length in a file system. Therefore, the transformed SDF format file is named by using hash values of the SMILES, such as a secure hash algorithm 1 (SHA1), and a mapping form is created in an output directory to store the corresponding relationship between the SMILES and the hash values, so as to ensure that the file naming is not affected by the length limitation.

In an embodiment, the autoregressive model may be deployed locally, thus giving full play to the advantages of local computing devices and obtaining higher operational efficiency and more flexible scheduling strategies. The autoregressive model supports to run under WINDOWS and LINUX operating systems, and users only need to operate according to a README document or prompts acquired by running Python drug_generator.py-h.

In an embodiment, the autoregressive model may be deployed on a Web end. For example, by deploying on GOOGLE COLAB, the users not familiar with an installation process can use DRUGGPT more easily, and fully use cloud graphics processing unit (GPU) resources, which significantly improves running efficiency.

In summary, for the problems of lower success rate, higher research and development costs and longer research and development cycle of the current drug design methods, the embodiment of the disclosure firstly constructs a GPT model, and trains the GPT model by using a large number of known protein-ligand interaction pairs. Potential small molecular compounds are generated by using the model, and are screened and optimized by methods such as molecular docking, quantitative structure-activity relationship (QSAR) and pharmacophore analysis. That is, the advanced natural language processing technology is used to explore a chemical space related to drug design, so as to find new molecules with a potential binding capacity for specific proteins, which provides a fast and efficient new method for the generation of drug candidate molecules.

The technical features of the above embodiments can be combined freely. In order to make the descriptions concise, not all possible combinations of respective technical features in the above embodiments are described. However, as long as there is no contradiction between the combinations of these technical features, they should be considered as the scope recorded in the description.

What is claimed is:

1. A drug design method based on an autoregressive model, comprising:

acquiring a ligand data set and a protein ligand data set, training protein information in the protein ligand data set by using a sub-word tokenization algorithm to obtain a protein tokenizer, and training ligand information in the ligand data set by using the sub-word tokenization algorithm to obtain a ligand tokenizer; and constructing a tokenizer of the autoregressive model by using the protein tokenizer and the ligand tokenizer;

processing and transforming original data in the ligand data set and the protein ligand data set into a text form suitable for the autoregressive model to obtain text data, and encoding the text data by the tokenizer of the autoregressive model to construct a training data set required by the autoregressive model;

training the autoregressive model by using the training data set to obtain a trained autoregressive model, so that the autoregressive model is configured to understand and learn an interaction mode between a protein and a ligand;

generating predicted ligand data by using the trained autoregressive model, and post-processing the predicted ligand data through a chemical or biological information tool to obtain candidate ligands each with a chemical structure; and evaluating and optimizing the candidate ligands, specifically comprising: performing structural optimization and activity prediction on the candidate ligands by using the chemical or biological information tool, to determine target candidate molecules;

wherein a simplified molecular input line entry system (SMILES) format of a ligand in a data set containing protein ligand pair information is trained by using a byte pair encoding (BPE) algorithm in the sub-word tokenization algorithm to obtain the ligand tokenizer; the ligand tokenizer comprises a first vocab.json of vocabulary and a first merges.txt of merging operation of the ligand, and a size of the first vocab.json of vocabulary is 3560;

wherein a size of a vocabulary of the protein is set to 50000, and an amino acid sequence of a protein in the data set containing protein ligand pair information is trained by using the BPE algorithm to obtain the protein tokenizer; the protein tokenizer comprises a second vocab.json of vocabulary and a second merges.txt of merging operation of the protein; and when constructing the tokenizer of the autoregressive model, a merging operation is performed on the first vocab.json of vocabulary of the ligand and the second vocab.json of vocabulary of the protein, a same word and a same word with different merging operations are deleted, after deleting a repeated word, most initial 256 characters in the BPE algorithm are supplemented as words to make up for a vacancy caused by deleting the repeated word, and after processing, a size of a vocabulary of the tokenizer of the autoregressive model is 53080.

2. The drug design method based on the autoregressive model according to claim 1, wherein objects used by the sub-word tokenization algorithm comprise: a text form representation of the ligand, a text form representation of the protein and a text form representation jointly formed by the protein and the ligand; and
wherein the sub-word tokenization algorithm decomposes a rare word into meaningful sub-words without dividing a common word into smaller sub-words.

3. The drug design method based on the autoregressive model according to claim 1, wherein the training data set comprises a ligand text data set and a protein ligand pair text data set, the ligand text data set and the protein ligand pair text data set are transformed from the ligand data set and the protein ligand data set, respectively, and specifical transforming steps comprise:
extracting the ligand information from the ligand data set and transforming the ligand information into ligand text data, and generating the ligand text data set by the tokenizer of the autoregressive model, so that the autoregressive model understands the representation of the ligand; and
extracting the protein ligand pair information from the protein ligand data set and transforming the protein ligand pair information into protein ligand pair text data, and generating the protein ligand pair text data set by the tokenizer of the autoregressive model, so that the autoregressive model is configured to capture potential characteristics and an activity relationship of the chemical structure of each of the candidate ligands to generate a target compound with drug activity.

4. The drug design method based on the autoregressive model according to claim 3, wherein when constructing the ligand text data set, a SMILES sequence is extracted from a zinc20 data set, and the SMILES sequence is transformed into the ligand text data in a format of '<|startoftext|>'+'<L>'+SMILES sequence+'<|endoftext|>'; and the ligand text data is encoded by the tokenizer of the autoregressive model to form the ligand text data set; and
when constructing the protein ligand pair text data set, the protein ligand pair information is extracted from the data set containing protein ligand pair information to obtain a protein ligand pair, and an amino acid sequence of a protein and a SMILES format of a ligand of the protein ligand pair are transformed into the protein ligand pair text data in a format of '<|startoftext|>'+'<P>'+the amino acid sequence of the protein in the protein ligand pair+'<L>'+the SMILES format of the ligand in the protein ligand pair+'<|endoftext|>'; and the protein ligand pair text data is encoded by using the tokenizer of the autoregressive model.

5. The drug design method based on the autoregressive model according to claim 4, wherein the training the autoregressive model comprises:
selecting an autoregressive model GPT-2 as a basic model, and performing model training on the autoregressive model GPT-2 by using a deep learning framework PYTORCH; and inputting a sequence of the protein ligand pair text data set into the autoregressive model GPT-2; wherein a target output corresponding to each input data element is a next element in the sequence of the protein ligand pair text data set.

6. The drug design method based on the autoregressive model according to claim 5, wherein the generating predicted ligand data by using the trained autoregressive model comprises:
when predicting a ligand of a specific protein, inputting an amino acid sequence or a fast-all (FASTA) format of the specific protein, and outputting a SMILES format of each of predicted ligands for the amino acid sequence of the specific protein; and
in response to the amino acid sequence of the specific protein and part of a ligand of the specific protein being known, when predicting rest of the ligand of the specific protein, based on inputting the amino acid sequence or the FASTA format of the specific protein, inputting the known part of the ligand of the specific protein, and outputting the SMILES format of each of the predicted ligands with a specific start.

7. The drug design method based on the autoregressive model according to claim 1, wherein the chemical or biological information tool comprises Open Babel and RDKIT.

8. A drug design method based on an autoregressive model, comprising:
acquiring a ligand data set and a protein ligand data set, training protein information in the protein ligand data set by using a sub-word tokenization algorithm to obtain a protein tokenizer, and training ligand information in the ligand data set by using the sub-word tokenization algorithm to obtain a ligand tokenizer; and constructing a tokenizer of the autoregressive model by using the protein tokenizer and the ligand tokenizer;
processing and transforming original data in the ligand data set and the protein ligand data set into a text form suitable for the autoregressive model to obtain text data, and encoding the text data by the tokenizer of the autoregressive model to construct a training data set required by the autoregressive model;
training the autoregressive model by using the training data set to obtain a trained autoregressive model, so that the autoregressive model is configured to understand and learn an interaction mode between a protein and a ligand;
generating predicted ligand data by using the trained autoregressive model, and post-processing the predicted ligand data through a chemical or biological information tool to obtain candidate ligands each with a chemical structure; and
evaluating and optimizing the candidate ligands, specifically comprising: performing structural optimization and activity prediction on the candidate ligands by using the chemical or biological information tool, to determine target candidate molecules;
wherein a simplified molecular input line entry system (SMILES) format of a ligand in a data set containing protein-ligand pairs is trained by using a byte pair encoding (BPE) algorithm in the sub-word tokenization algorithm to obtain the ligand tokenizer; the ligand tokenizer comprises a first vocabulary of the ligand and a first merging operation of the ligand, and a size of the first vocabulary is 3560;
wherein a size of a vocabulary of the protein is set to 50000, and an amino acid sequence of a protein in the data set containing protein-ligand pairs is trained by using the BPE algorithm to obtain the protein tokenizer; the protein tokenizer comprises a second vocabulary of the protein and a second merging operation of the protein; and when constructing the tokenizer of the autoregressive model, a merging operation is performed on the first vocabulary of the ligand and the second vocabulary of the protein, a same word and a same word with different merging operations are deleted, after deleting a repeated word, most initial 256 characters in the BPE algorithm are supplemented as words to make up for a vacancy caused by deleting the repeated word, and after processing, a size of a vocabulary of the tokenizer of the autoregressive model is 53080.

* * * * *